June 16, 1925.

J. H. SPARKS

VEHICLE WHEEL

Filed Jan. 17, 1925

Inventor

J. H. Sparks

By A. Randolph Jr.

Attorney

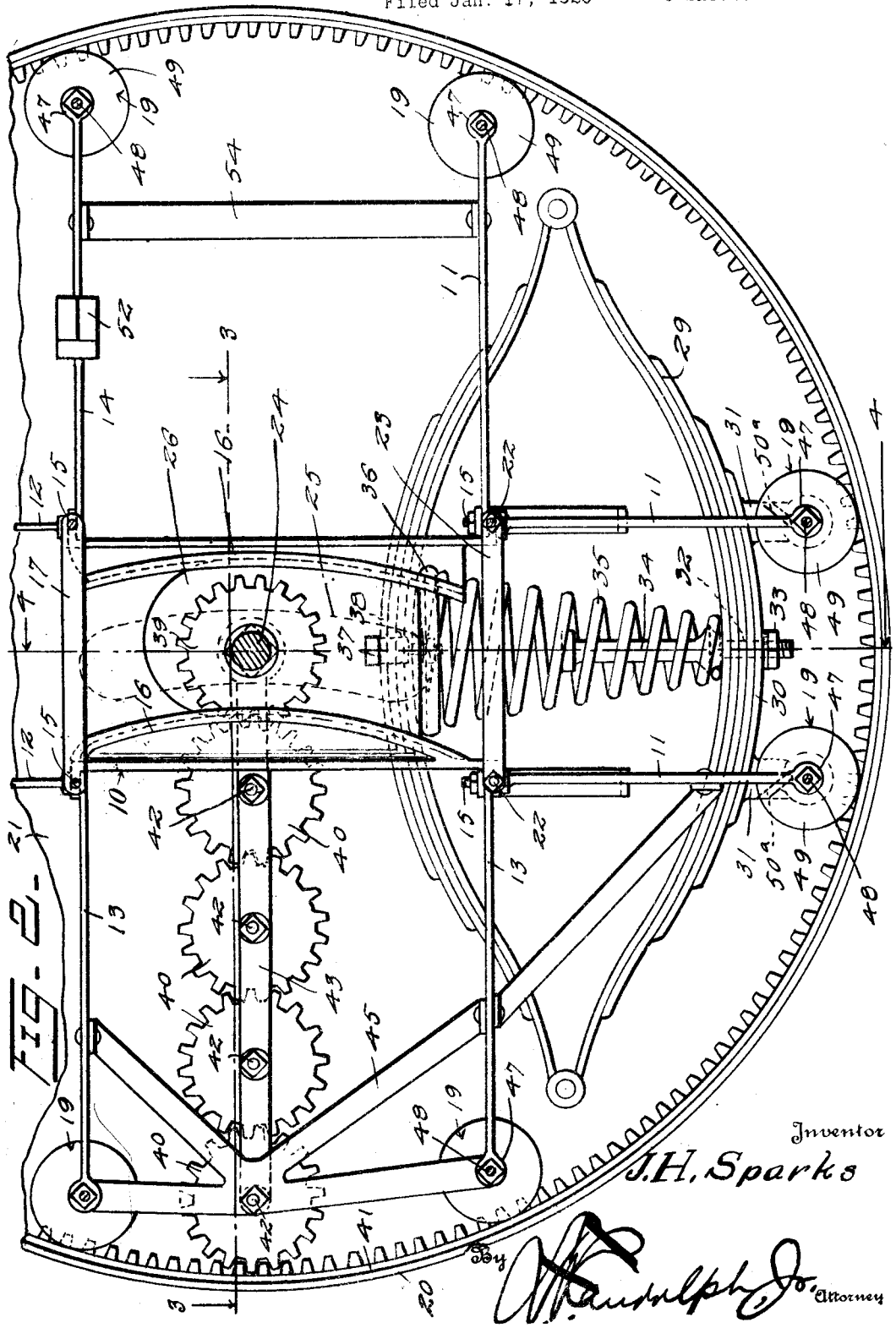

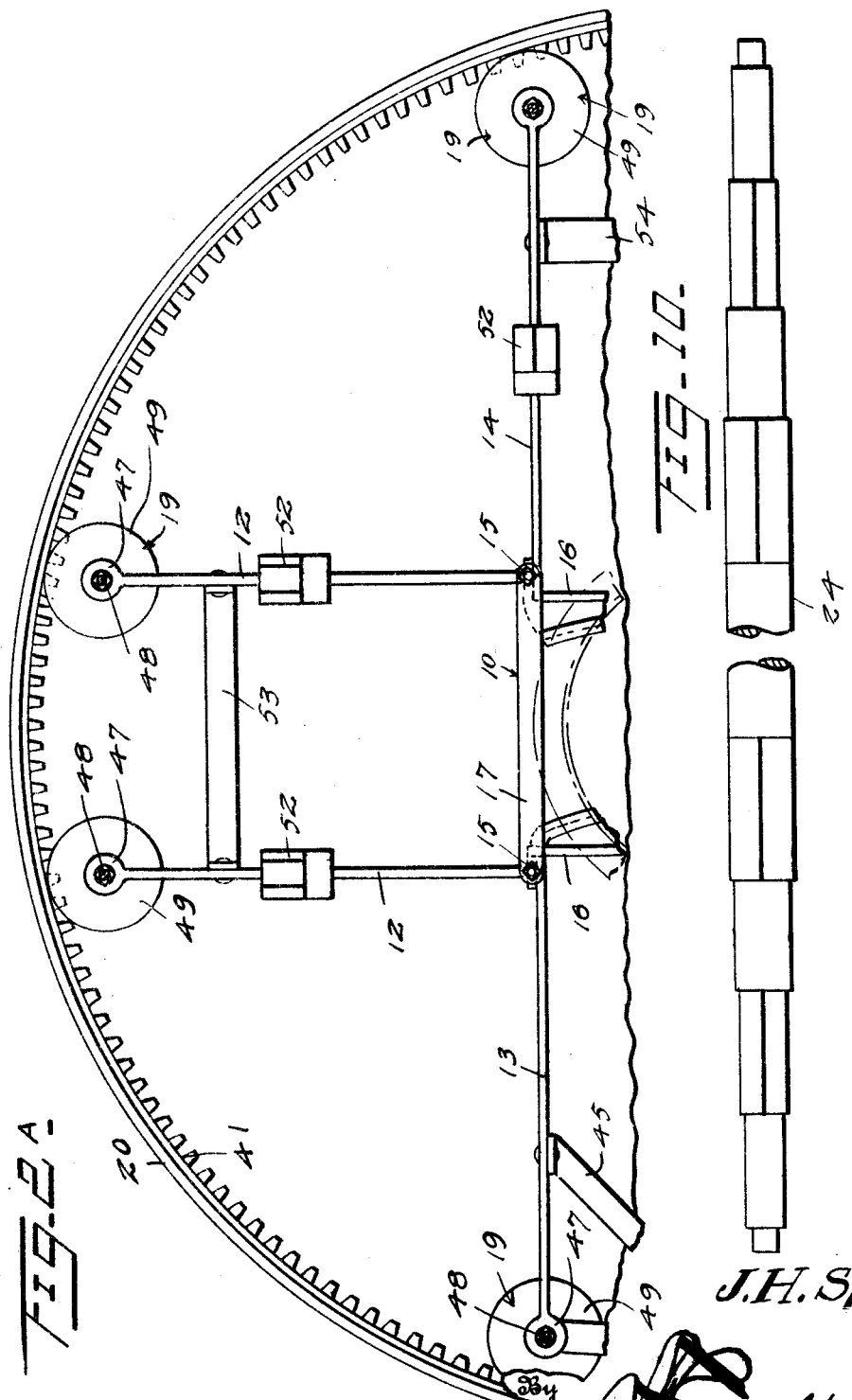

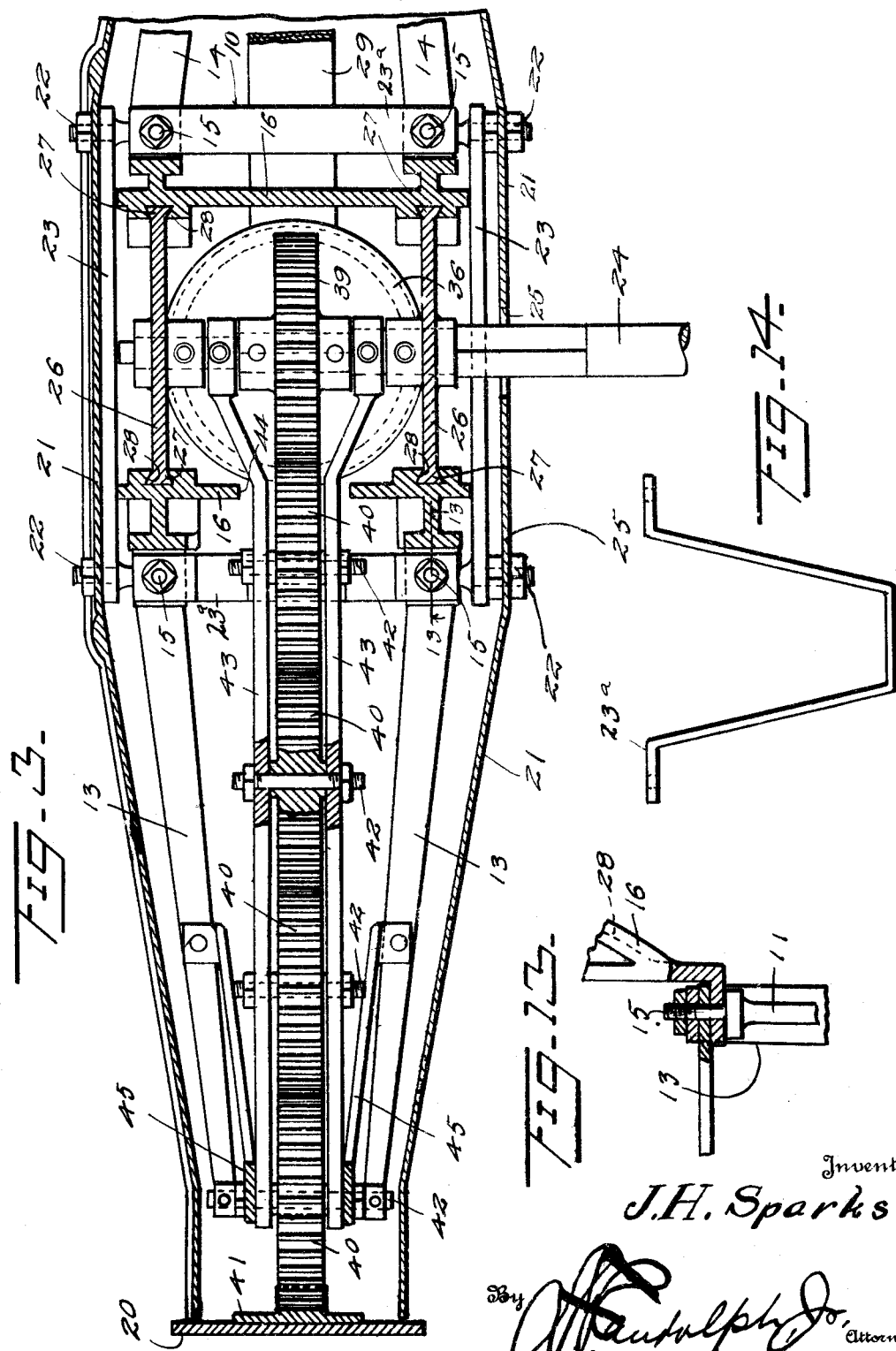

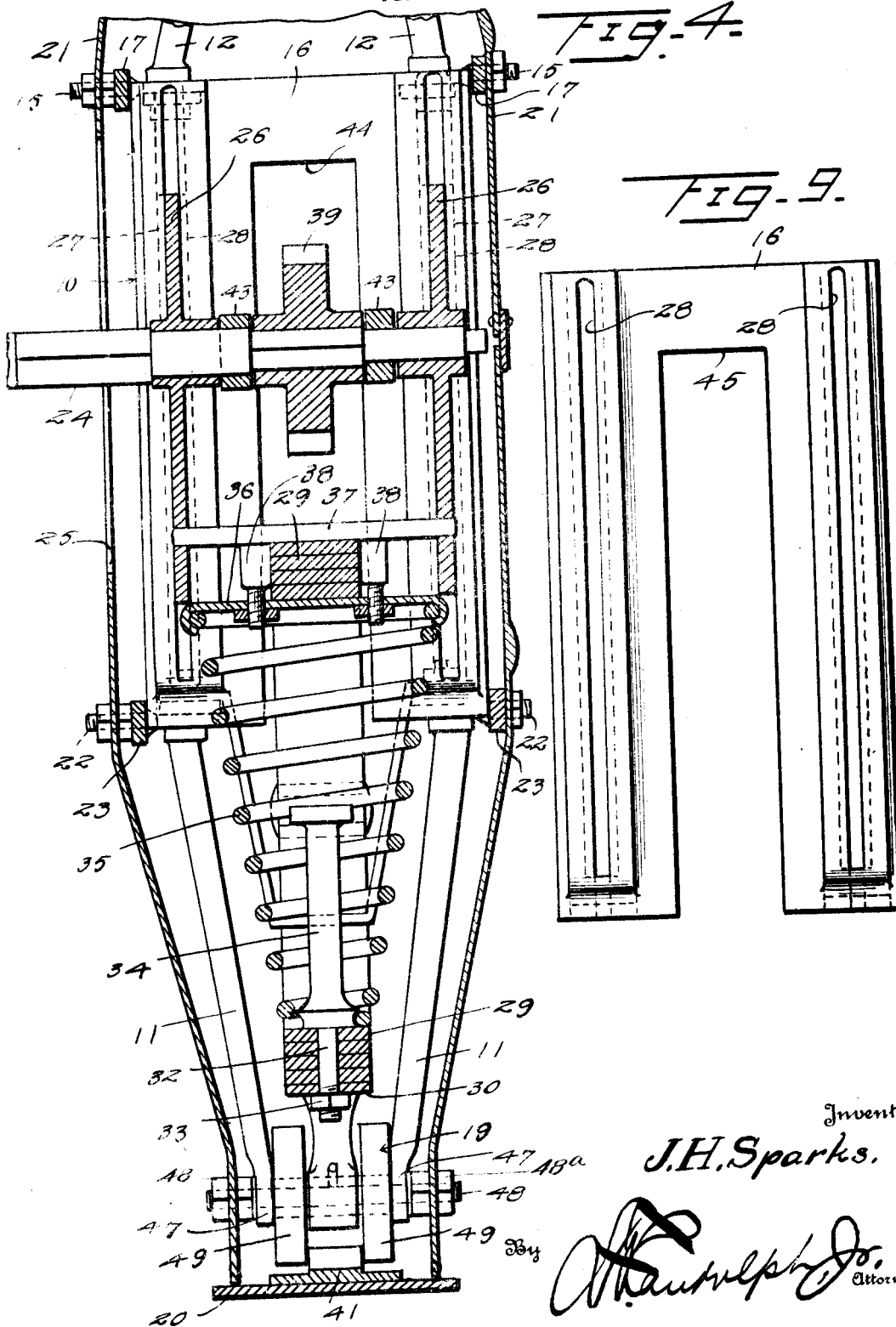

June 16, 1925
J. H. SPARKS
VEHICLE WHEEL
Filed Jan. 17, 1925
1,541,867
6 Sheets-Sheet 6
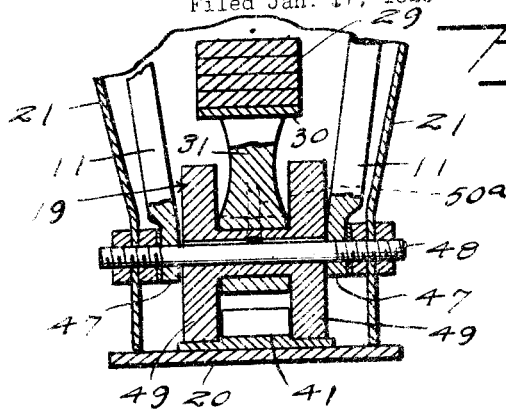
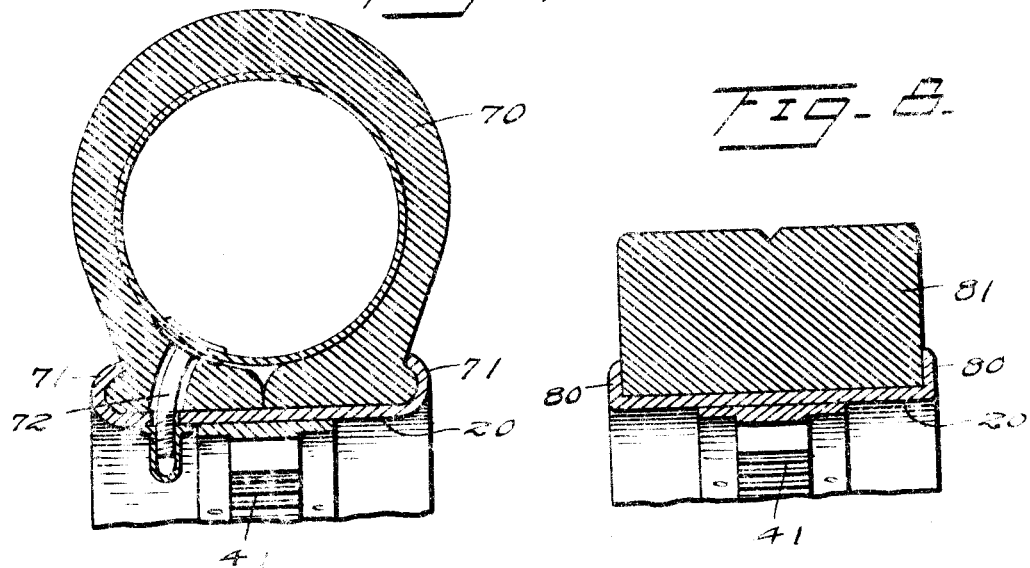
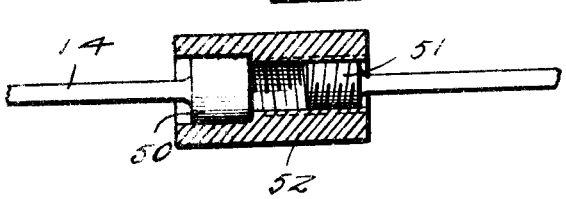
Inventor
J. H. Sparks
By Patented June 16, 1925.

1,541,867

UNITED STATES PATENT OFFICE.

JOHN HENRY SPARKS, OF WESTVILLE, NEW JERSEY.

VEHICLE WHEEL.

Application filed January 17, 1925. Serial No. 3,182.

*To all whom it may concern:*

Be it known that I, JOHN H. SPARKS, a citizen of the United States, residing at Westville, in the county of Gloucester and State of New Jersey, have invented certain new and useful Improvements in Vehicle Wheels; and I do hereby declare the following to be a full, clear, and exact description of the invention, such as will enable others skilled in the art to which it appertains to make and use the same.

This invention relates to a vehicle wheel.

It is aimed to provide a wheel adapted for general use on vehicles in which a part of the wheel may remain relatively stationary while another part, particularly the tire, may turn or move with respect thereto.

It is also aimed to provide a structure of this character in which the parts may be held firmly in place, will give long service, will tend to prevent accidents in driving a vehicle especially in connection with the braking and one in which a wheel of greater diameter may be used so as to greatly reduce the force of shock from uneven roads and further reduce the vibration, may be driven slower and will reduce the consumption of fuel in the engine of the vehicle in connection with which it is used.

Another object is to provide a construction wherein the vehicle may be supported resiliently from means completely within the wheel, thus enabling the vehicle to dispense with the present bolster springs or use them optionally.

Additional objects and advantages will become apparent from a consideration of the description following taken in connection with accompanying drawings illustrating an operative embodiment.

In said drawings:

Figure 2 is a partial view of the opposite side thereof showing the lower portion of the wheel;

Figure 1:
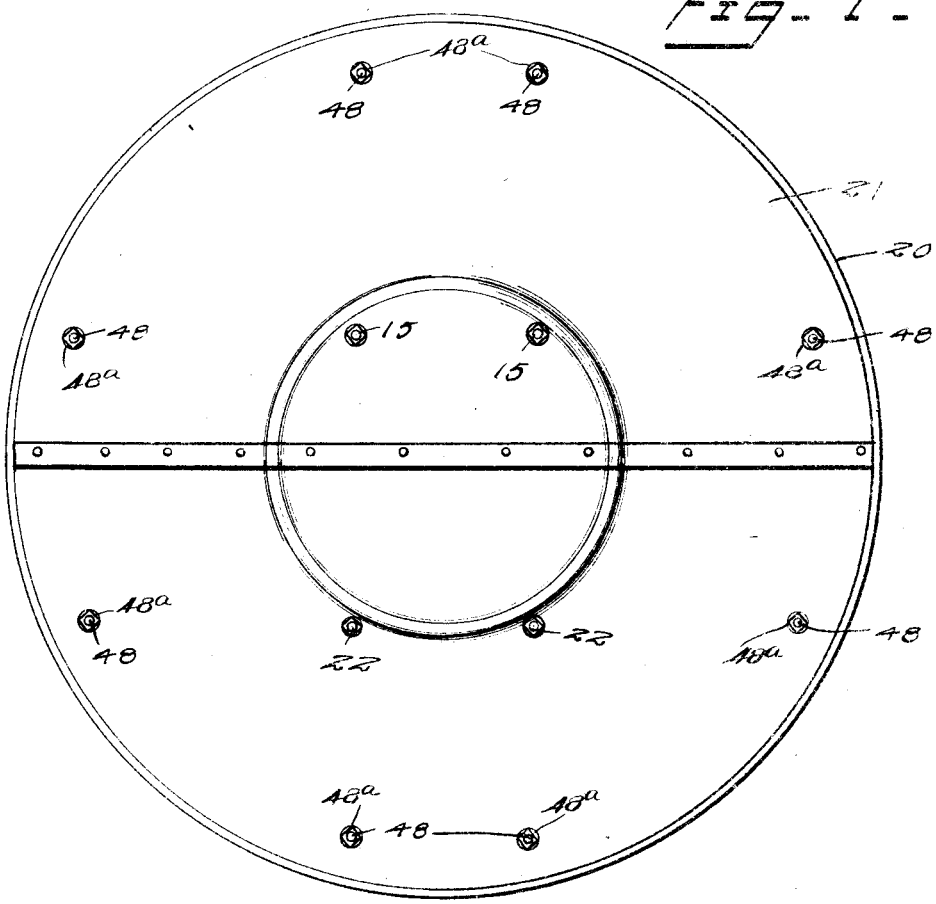
Figure 1 is a view of the wheel in front elevation.
Figure 12:
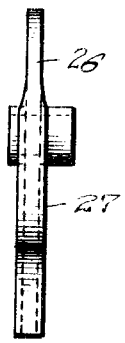
Figure 11:
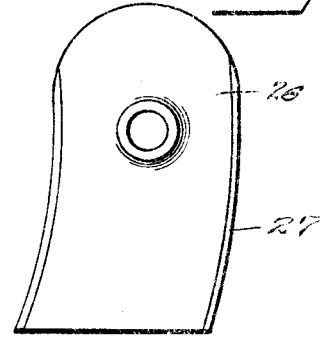

Figure 2ᴬ is a similar view showing the upper portion of the wheel;

Figure 3 is a horizontal sectional view taken on the line 3—3 of Figure 2;

Figure 4 is a vertical sectional view taken on the line 4—4 of Figure 2;

Figure 5 is an enlarged sectional view illustrating the engagement between the tire and rollers;

Figure 6 is an enlarged sectional view illustrating the adjustable connection of one of the spokes;

Figure 7 is a view showing the rim in connection with a pneumatic tire applied thereto, Figure 8 is a detail sectional view showing a solid tire applied to the vehicle tire or rim;

Figure 9 is a detail view of a stationary hub plate;

Figure 10 is a detail view of the axle;

Figure 11 is a detail side view of a sliding hub plate;

Figure 12 is an edge view of the hub plate shown in Figure 11;

Figure 13 is a detail sectional view on the line 13—13 of Figure 3; and

Figure 14 is a detail view of one of the cross stays.

Referring specifically to the drawings wherein like reference characters designate like or similar parts, a suitable frame work 10 is provided within the wheel comprising lower vertical spokes 11, upper vertical spokes 12, front horizontal spokes 13 and rear horizontal spokes 14. At 15, suitable bolts connect the various spokes together in the arrangement shown and also rigidly with stationary vertical hub plates at 16. Said stationary hub plates 16 may be bridged by a brace 17 at their upper ends and fastened in place by the adjacent bolts 15. Briefly, the spokes carry rollers 19, whose peripheries are in contact with the inner surface of a rigid metallic rim or tire 20, which is adapted to revolve with respect to the frame 10. The construction of said rollers and associated parts will be later specifically described.

The wheel is preferably substantially closed and to this end has disks or plates as 21 of any suitable size and shape detachably applied to the frame 10, for instance by means of bolts and nuts as at 22 in appropriate locations. Certain of said bolts 22 at each side of the wheel mount removably, rigidifying plates or stays as at 23.

A driven or rotatable axle 24 passes through a suitably enlarged opening 25 in one of the closure plates 21 and is journaled in movable hub plates 26. Hub plates 26 are as shown in Figure 11 slightly arc-shaped and have dovetailed webs 27 which are vertically slidable in curved tracks 28 of the stationary plates 16 and which conform in shape thereto.

Located within the wheel adjacent the base thereof is a suitable elliptic spring 29, preferably being of the laminated type as shown. This spring is preferably supported from below by a bracket or plate 30, removably mounted on the lower ends of the spokes 11 by means of hubs as at 31. A clip bolt 32 passes through the leaves of the lower half of spring 29 and is fastened in place by a nut 33. Said bolt 32 also passes through an opening in the bracket 30. Bolt 32 has an enlarged portion or post 34 above the lower section of the spring 29 and resting thereon. The post 34 serves to center an inverted conical expansive coil spring 35 which is seated against a retainer 36 at its top and which retainer engages the under surface of the upper sections of the spring 29. A suitable bracket or clip 37 passes removably through the movable plates 26 and has bolt studs 38 which straddle the upper section of spring 29 and pass through the plate or retainer 36 and secure it in place.

Axle 24 has a square portion centrally of the sides of the wheel and thereon a pinion or gear wheel 39 is keyed or otherwise fastened. Said gear wheel meshes with the adjacent gear or pinion of a train of gears or pinions 40, arranged horizontally as shown, the outermost gear 40 in turn meshing with an annular rack 41 of less width than the rim 20 and provided on the inner surface thereof centrally of the sides of the wheel. The pinions 40 have axles 42 on which the pinions are journaled and which axles are removably fastened in bearing arms 43 passing through the adjacent stationary hub plate 16 at an enlarged slot 44 thereof, are loosely mounted at one end on the axle 24 and at their other ends are connected to K-shaped bearings or struts 45 secured to the spokes 13. Strut 46 may brace the lowermost spoke 13 from the adjacent spoke 11.

Each of the spokes at its outer end has a bearing 47 in which a pin or axle 48 is removably journaled and on which pins, the rollers 19 aforesaid are journaled. Said rollers 19 are of double construction inasmuch as they have spaced disks 49 so that they may straddle the teeth of the rack 41 and engage the rack 41 on its smooth inner surfaces on opposite sides of said teeth of rack 41. The pins 48 extend through the protective side plates or disks 21 of the wheel and are secured thereto by the threaded nuts 48$^a$.

In order that the rollers and rim may properly fit, certain or all of the spokes may be adjustable or extensible. To this end such spokes may have oppositely screw threaded portions 50 and 51 at the different sections thereof engaged by a nut 52 having oppositely screw threaded portions engaging the portions 50 and 51 as shown. The spokes 12 may be braced from each other by a bar as at 53 and the spokes 14 may also be braced by a bar at 54.

Particular attention is called to the fact that the axle 24 as it moves vertically, takes the path of an arc from the outermost pin or shaft 42 as a center, to the end that all of the pinions and rack 41 will at all times be in mesh. To accomplish this result, the tracks 28 are arcuate as shown and the webs 27 are of corresponding shape. In effect, the bearing arms 43 work as levers with the axle 24, and with such parts carrying the pinions.

It will be understood that all of the shafts or pins described are of any approved construction and may be equipped in any suitable way with oil cups or arranged for lubrication and for instance by the means 50$^a$ as previously described.

As shown in Figure 7, the rim 20 may be equipped with a suitable pneumatic tire as at 70, the edges of the rim 20 preferably being curved at the sides as at 71 so that it will be of the usual channel form. The inflation stem 72 of the pneumatic tube of said tire may be specially arranged as shown so as to extend through the rim adjacent one side thereof.

Instead of a pneumatic tire, a solid tire of rubber or the like as suggested in Figure 8 may be applied to the rim 20, such rim having at its sides, retaining flanges 80 for such tire which is designated 81.

In use, the tire is primarily adapted for use at the rear end of a vehicle, one being provided on each side thereof although no limitation as to the use is to be incurred. The axle 24 being driven in turn drives the pinions 39 and 40 and rack 41, causing the rim to turn with respect to the remainder of the wheel and thus have tractive action with the highway or surface being traveled. Any obstructions encountered will cause relative movement of the wheel and the axle, which movement will be cushioned by the springs 29 and 35, since the movable plates 26 will slide up and down or the wheel will slide with respect to them. Incidental to this sliding movement, the bearing arms 43 swing from the axis of the outermost shaft 42, thus always keeping the pinions in proper relation so as to drive the rim.

It is obvious that the wheel as a whole may be rigidly attached in any desired manner to the vehicle with which it is associated.

Changes may be resorted to provided they fall within the spirit and scope of the invention.

I claim as my invention:

1. A wheel of the class described having a body, an axle extending into the body, a rim movable relatively to the body, means operable by said axle to move said rim, means to permit yielding movement of the axle with respect to the body, and means associated with the first mentioned means to compensate for the said movement whereby the first mentioned means will operate under all conditions.

2. A wheel of the class described having a body, an axle extending into the body and vertically movable, a rim on said body, bearing means movable with said axle, and means including gearing on said bearing means to drive said rim from said axle.

3. A wheel of the class described having a body, an axle extending into the same and movable away from the axis thereof, means causing said movement to be in an arcuate path, a rim on said body, and means to drive said rim from said axle.

4. A wheel of the class described having a body, a movable hub plate on said body, an axle movable with said hub plate and rotatable with respect to the same, means to guide movement of said hub plate, a rim movable about said body, and gearing driven from said axle to rotate said rim.

5. A wheel of the class described having a body, a movable hub plate on said body, an axle movable with said hub plate and rotatable with respect to the same, means to guide movement of said hub plate, a rim movable about said body, a bearing arm engaging said axle and pivoted to the body, and a train of gearing on said axle, arm and pivot operable to rotate said rim.

6. A wheel of the class described having a body, a movable hub plate on said body, an axle movable with said hub plate and rotatable with respect to the same, means to guide movement of said hub plate, a rim movable about said body, a bearing arm engaging said axle and pivoted to the body, and a train of gearing on said axle, arm and pivot operable to rotate said rim, and stationary hub plates engaged by the first mentioned hub plate to cause the same to follow an arcuate course.

7. A wheel of the class described having a body, an axle extending into the body and movable away from the axis thereof, resilient means to cushion the movement of said axle, a rim on said body, and means to rotate said rim with respect to the body from said axle.

8. A wheel of the class described having a body, a rim on said body, an axle extending into the body, means to rotate the rim from said axle, a hub plate engaged by said axle, and spring means cushioning the movement of said hub plate.

9. A wheel of the class described having a body, a rim on said body, an axle extending into the body, means to rotate the rim from said axle, a hub plate engaged by said axle, and spring means cushioning the movement of said hub plate comprising an elliptic spring, an expansive spring within the space of the elliptic spring and engaging the opposite portions thereof, a retainer for said cushioning spring, and a clip connecting said hub plate and retainer.

10. A wheel of the class described having a body, a rim movable relatively thereto, an axle extending into the body, means to drive said rim from said axle, a cushioning spring for said axle disposed within the body, a supporting bracket for said spring, and means mounting said supporting bracket within the wheel.

11. A wheel of the class described having a body, a rim movable relatively thereto, an axle extending into the body, means to drive said rim from said axle, a cushioning spring for said axle disposed within the body, a supporting bracket for said spring, and means mounting said supporting bracket within the wheel, a bolt connecting the lower portion of said spring and bracket, said bolt having a post, and a cushioning spring intermediate the portions of the first mentioned spring positioned by said post.

12. A wheel of the class described having a body including spokes, a rim movable relatively to the body, an axle, means to drive said rim from said axle, said axle being movable relatively to the axis of the body, spring means to cushion the movement of said axle, and a bracket carried by certain of said spokes and mounting said spring means.

13. A wheel of the class described having spokes, a rim movable with respect to the spokes, means of engagement between the rim and spokes, stationary hub plates, means to secure said hub plates and spokes together, a movable hub plate associated with the first mentioned hub plates, an axle engaging said movable hub plate, cushioning means for said movable hub plate, and means driven by said axle to move said rim.

14. A wheel of the class described having spokes, a rim movable with respect to the spokes, means of engagement between the rim and spokes, stationary hub plates, means to secure said hub plates and spokes together, a movable hub plate associated with the first mentioned hub plates, an axle engaging said movable hub plate, cushioning means for said movable hub plate, and means driven by said axle to move said rim comprising a train of gearing, certain gears of said train being carried by a bearing pivoted on said axle and from means supported by said spokes.

15. A wheel of the class described having a body, a rim movable with respect to the body having rack teeth, means on the body engageable with said rack teeth to drive said rim relatively to the body, and rollers on said body straddling said teeth and engaging the rim on opposite sides of said teeth.

16. A wheel of the class described having a body, a rim movable with respect to the body having rack teeth, means on the body engageable with said rack teeth to drive said rim relatively to the body, and rollers on said body straddling said teeth and engaging the rim on opposite sides of said teeth, spokes carrying said rollers, pins on which said rollers are journaled, and covering disks for the body secured in place by said pins.

17. A wheel of the class described having a body, a rim movable relatively to the body, means to move said rim relatively to the body, means of engagement between the body and said rim, and the last mentioned means being adjustable to insure operative engagement of the parts.

In testimony whereof I affix my signature in presence of two witnesses.

JOHN HENRY SPARKS.

Witnesses:
WM. L. McKEEVER,
ALBERT C. PERKINS.